United States Patent
Tanaka

(10) Patent No.: US 7,724,665 B2
(45) Date of Patent: May 25, 2010

(54) COMMON CHANNEL FLOW CONTROL METHOD AND SYSTEM

(75) Inventor: Shoji Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 876 days.

(21) Appl. No.: 10/484,086

(22) PCT Filed: Jul. 17, 2002

(86) PCT No.: PCT/JP02/07263

§ 371 (c)(1),
(2), (4) Date: Jan. 16, 2004

(87) PCT Pub. No.: WO03/009540

PCT Pub. Date: Jan. 30, 2003

(65) Prior Publication Data

US 2004/0170127 A1 Sep. 2, 2004

(30) Foreign Application Priority Data

Jul. 18, 2001 (JP) .............................. 2001-218777

(51) Int. Cl.
| | |
|---|---|
| *G01R 31/08* | (2006.01) |
| *G08C 15/00* | (2006.01) |
| *G06F 11/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/56* | (2006.01) |
| *G06F 15/16* | (2006.01) |

(52) U.S. Cl. .................... 370/235; 370/395.2; 709/229; 709/235

(58) Field of Classification Search .................. 370/235
See application file for complete search history.

(56) References Cited

U.S. PATENT DOCUMENTS 5,311,513 A * 5/1994 Ahmadi et al. .............. 370/230

(Continued)

FOREIGN PATENT DOCUMENTS

CN         1284249 A        2/2001

(Continued)

OTHER PUBLICATIONS

European Patent Office issued an European Search Report dated Dec. 4, 2009, Application No. 02749310.5.

*Primary Examiner*—William Trost, IV
*Assistant Examiner*—Andrew Chriss
(74) *Attorney, Agent, or Firm*—Young & Thompson

(57) ABSTRACT

A flow control method includes a step of receiving individual data of each session from a network in an individual trunk apparatus and transmitting the received individual data as a transmission side common channel data to a common buffer, a step of temporarily storing data of plural sessions received from the individual trunk apparatus all at once and monitoring the congestion of the common channel according to the common buffer use amount, and upon detection of a congestion level, a step of stopping or limiting transmission of individual data of a session corresponding to a QoS class having a low priority from the individual trunk apparatus to the common buffer.

12 Claims, 8 Drawing Sheets

U.S. PATENT DOCUMENTS

| | | | |
|---|---|---|---|
| 5,434,848 A * | 7/1995 | Chimento et al. | 370/232 |
| 6,005,853 A | 12/1999 | Wang et al. | |
| 6,044,061 A * | 3/2000 | Aybay et al. | 370/230 |
| 6,381,244 B1 * | 4/2002 | Nishimura et al. | 370/395.21 |
| 6,925,057 B2 * | 8/2005 | Cheng et al. | 370/235 |
| 2002/0012349 A1 * | 1/2002 | Schoute | 370/394 |
| 2002/0075805 A1 * | 6/2002 | Gupta et al. | 370/235 |
| 2002/0085507 A1 * | 7/2002 | Ku et al. | 370/255 |
| 2006/0039281 A1 * | 2/2006 | Benveniste | 370/230 |

FOREIGN PATENT DOCUMENTS

| | | | |
|---|---|---|---|
| CN | 1289519 A | | 3/2001 |
| EP | 0 782 302 | | 7/1997 |
| EP | 1 061 762 | | 12/2000 |
| JP | 11-266262 | | 9/1999 |
| JP | 11266262 A | * | 9/1999 |
| JP | 2000-151633 | | 5/2000 |
| JP | 2000151633 A | * | 5/2000 |
| WO | WO 99/27740 | | 6/1999 |
| WO | WO/00/35235 | | 6/2000 |

* cited by examiner

COMMON CHANNEL FLOW CONTROL METHOD AND SYSTEM

TECHNICAL FIELD

This invention relates to a wireless communication system having common channels for multiplex transmission of data and individual channels as wireless transmission lines between a base transceiver station and mobile terminals, and particularly to a flow control of a common channel in a base station control system installed in a wireless communication system such as mobile communication.

BACKGROUND ART

In the field of mobile communication systems mainly including portable telephone systems, the number of users increases rapidly, and also diversified content services have increased the amount of transmission data. This escalates demands for higher communication qualities. However, since the radio wave resources for communication have limitation, for example, in the case of communication congestion in a portable telephone system, namely, when a congestion condition occurs at a base transceiver station, problems occurs in communication quality, such as partial interruption of communication.

As countermeasures, various methods have been adopted. One of them can eliminate the congestion condition by flow control of communication data in a base transceiver station transmitting-receiving control system. This method is adopted for flow control of individual data concerned with common channels particularly in the case that common channels for multiplex transmission of data and individual channels are included as radio wave transmission lines between a base transceiver station and mobile terminals, providing accomplishments in acquiring the required communication quality.

Hereinbelow, a conventional method of flow control for the common channel in a base transceiver station will be described.

FIG. 1 shows a construction of a base station transmitting-receiving control apparatus in wireless communication providing multiple access including common channels for multiplex transmission. Here, it shows a data flow from TCP/IP (transmission control protocol/Internet protocol) network 2 to the base transceiver station (BTS; base transceiver station) 4 around base station transmitting-receiving control apparatus 1 for wireless communication, with assumption of multiple access including common channels for multiplex transmission.

Data for each session is transmitted from TCP/IP network 2 to exchange 3 and from exchange 3 via a plurality of individual lines L to transmitting-receiving control apparatus 1 of the base transceiver station. The data is subjected to necessary processes in transmitting-receiving control apparatus 1 and then transmitted to base transceiver station 4. Further, while not shown in the drawing, the multiplexed data is transmitted via the base transceiver station to communication terminals (remote terminals), which are communication objects.

Transmitting-receiving control apparatus 1 comprises individual trunk apparatus 11 receiving individual lines L, common buffer apparatuses 12a, 12b corresponding to common channels, multiplexing apparatus 13 providing connection to base transceiver station 4 with multiplexing a plurality of channels. Within individual trunk apparatus 11, for each individual line L, individual line unit "a" for receiving individual data is provided for each session. In the following description, it is assumed that there are n channels including channel 1 (ch.1) and channel 2 (ch.2) for common channels and the remaining channels are for individual channels, and that common buffer apparatus 12a corresponds to channel 1 which temporarily stores individual data pieces (a1, a2, a3) from the individual line unit for three lines. Similarly, the common buffer apparatus 12b corresponds to channel 2 that temporarily stores individual data pieces (a4, a5, a6) from the individual line unit for three lines. Further, individual channels in multiplexing apparatus 13 correspond to individual line unit "a" in the individual trunk apparatus 11 one to one, respectively.

Next, the operation and process in transmitting-receiving control apparatus 1 will be described.

At first, individual trunk apparatus 11 receives individual data for each session with the individual line unit "a" and transmits to common buffer apparatus 12a the individual data piece (for example, individual data pieces a1, a2, a3) requiring the multiplexing process. Individual trunk apparatus 11 transmits individual data corresponding to an individual channel to multiplexing apparatus 13 as it is.

Common buffer apparatus 12a temporarily stores these pieces of data transmitted from individual trunk apparatus 11 and then transmits them to multiplexing apparatus 13. Multiplexing apparatus 13 executes a multiplexing process for the data received from common buffer apparatus 12a and transmits it to base transceiver station 4 as data of common channel (ch.1).

Now, the method of flow control will be described for the case that a congestion condition occurs in common channel ch.1. on the basis of FIG. 2 in which only individual data pieces of sessions associated with the common channel ch.1 are shown for individual trunk apparatus 11.

At first, in S400, individual data for each session is transmitted from individual trunk apparatus 11 to common buffer apparatus 12a. As a result, an amount of data temporarily stored in common buffer apparatus 12a, namely, an amount of the used portion in the buffer, exceeds a congestion threshold value in step S401. That is, a congestion condition is detected.

As a result, in step S402, common buffer apparatus 12a informs individual trunk apparatus 11 about setting the flow control for individual data pieces a1, a2, and a3 using a broadcast message. In response to this notice of setting the flow control, the individual trunk apparatus 11 uniformly stops or restricts transmission of individual data pieces a1, a2, and a3 to common buffer apparatus 12a.

Stopping or restricting the transmission causes the amount of the used portion of the buffer to decrease below the congestion threshold in step S403, eliminating the congestion condition in common channel ch.1. In response to this, in step S404, common buffer apparatus 12a informs individual trunk apparatus 11 about release of the flow control for individual data pieces a1, a2, and a3. Then, in step S405, transmission from individual trunk apparatus 11 to common buffer apparatus 12a is restored to the usual data flow rate. Here, the data flow rate is represented as an amount of data per a unit interval, typically, the number of bits of data per a unit interval.

According to the above-described method the congestion condition can be eliminated in common channel ch.1. However, in this method of flow control, because the data rate is uniformly restricted for each session, the required communication quality or performance may not be achieved due to data delay in accordance with the quality of service (QoS; Quality of service) class required for each session. For example, though no problem occurs in communication of a still picture by such a flow control, in a moving picture communication associated with a voice, the required QoS may not be maintained because a portion of voice or a picture may drop out.

DISCLOSURE OF THE INVENTION

A first object of the present invention is to provide a method of flow control for the common channel capable of eliminating a congestion condition with a QoS required for each session.

A second object of the present invention is to provide a flow control system for the common channel capable of eliminating a congestion condition with a QoS required for each session.

The inventor of the present invention was lead to have the present invention by directing the inventor's attention to the fact that, in most cases, a plurality of sessions co-existing in the common channel have different QoS classes required for respective sessions, and accompanied with this, limits in restricting data transmission for keeping necessary communication qualities are different from each other.

That is, the first object of the present invention can be achieved by a method of flow control for a common channel in a base station transmitting-receiving control system for wireless communication for multiple access including the common channel for multiplex transmission, the method comprising the steps of: receiving individual data for each session from a network at an individual trunk apparatus and transmitting the received individual data to the a common buffer as transmission side common channel data; temporarily storing data of a plurality of the sessions received from the individual trunk apparatus in the common buffer all together and monitoring a congestion condition of the common channel from an amount of used portion of the common buffer; and halting or restricting transmitting individual data of a session corresponding to a QoS class having a priority that is low to said common buffer from said individual trunk apparatus when the congestion condition is detected.

According to this method of flow control, congestion conditions can be eliminated with a necessary communication quality because the data flow rate is controlled on the basis of the priority determined on the basis of QoS classes. That is, uniformly, a session with a high priority is transmitted in the same condition as it was transmitted before restriction on the data flow rate, and a session with a low priority is restricted with respect to its data flow rate, so that communication qualities are kept. Furthermore, if it is confirmed that the congestion condition has been eliminated, the initial data communication condition can be restored by transmitting an instruction of releasing the flow control for restricting the data flow rate from the common buffer side to the individual trunk apparatus.

In this method, preferably, the session of which data flow rate is to be controlled is discriminated using the relationship of weighting on the basis of the data flow rate or an amount of remaining data in the common buffer and the QoS class for each session. This controls the data flow rate in the common buffer for each session on the basis of the QoS class required for the session with a result that the congestion condition can be eliminated while the necessary communication quality is maintained.

Further, there are two methods of discriminating the session corresponding to a QoS class with a low priority, and either of them can be adopted.

(1) When the common buffer receives individual data, its QoS class for each session is discriminated and registered in advance. When a congestion condition is detected, the common buffer side identifies the object session from the QoS class to be subjected to the flow control and instructs the individual trunk apparatus to do the flow control with specifying the individual data corresponding to the session.

(2) When a congestion condition is detected, the common buffer side informs the individual trunk apparatus about the object QoS class to be subjected to the flow control. The individual trunk apparatus side identifies individual data of the session corresponding to the specified QoS class and performs the flow control.

In addition, if a plurality of sessions have the same QoS classes and are to be subjected to the flow control, generally, all sessions are subjected to the flow control. However, if there is a session from a user requiring a high QoS class, it is also possible to increase the priority only for the session by setting the above-described threshold value high.

Further, in this invention, the transmission data flow rate from the individual trunk apparatus may be restricted in accordance with the magnitude of a difference between a value of the priority and a threshold value. This structure more efficiently eliminates congestion conditions with necessary communication qualities. For example, if the difference between a value of priority and a threshold value is large, an amount of restricting the transmission data flow rate is set large or full. If the difference is small, the amount of restricting the transmission data flow rate is set small. That is, the transmission data flow rate is controlled in proportion to the magnitude of the difference between the value of priority and the threshold value to provide efficient elimination of congestion conditions.

The first object of the present invention can be also achieved by a method of flow control for a common channel in a base station transmitting-receiving control system for wireless communication for multiple access including the common channel for multiplex transmission, the method comprising the steps of: receiving individual data for each session from a network at an individual trunk apparatus and transmitting the received individual data to a common buffer as transmission side common channel data; temporarily storing data of a plurality of the sessions received from the individual trunk apparatus in the common buffer all together and monitoring a congestion condition of the common channel from an amount of used portion of the common buffer; and when the congestion condition is detected in the condition that a vacant channel exists in individual channels on the multiple access, directly assigning the individual data of the session corresponding to a QoS having a priority that is high to the vacant channel at a transmission side from the individual trunk apparatus to transmit it.

This can eliminate congestion conditions with necessary communication qualities because the data transmission is controlled on the basis of the priority determined on the basis of QoS classes. That is, uniformly, a destination of data of a session with a high priority is preferentially switched from a common channel to a vacant channel in the individual channels to provide communication qualities and as well as elimination of the congestion condition in the common channel. Furthermore, if it is confirmed that the congestion condition has been eliminated, the initial data communication condition can be restored by transmitting from the common buffer side to the individual trunk apparatus an instruction of releasing the data transmission switching control to a vacant channel in the individual channels.

As switching from a common channel to a vacant channel in individual channels, there is a concrete example of switching from a common channel to an individual channel on the basis of the specification of the third generation mobile telecommunications system. In that case, data is directly transmitted from an individual channel to the base transceiver station. In addition, information of a vacant channel in the individual channels is provided by channel management carried out by call connection control, and it is checked by either of the common buffer side or the individual trunk apparatus whether such a vacant channel exists on the basis of the information. If existence of a vacant channel is confirmed, the flow control is performed as described above.

Here, preferably, the session of which data transmission is to be controlled is discriminated using the relationship of weighting on the basis of the data flow rate or an amount of remaining data in the common buffer and the QoS class for each session. This controls the data communication for each session on the basis of the QoS class required for the session, so that the congestion condition can be eliminated with necessary communication quality.

Further, there are two methods of recognizing the session corresponding to a QoS class with a high priority, and either of them can be adopted.

(1) When the common buffer stage receives individual data, its QoS class for each session is discriminated and registered in advance. When a congestion condition is detected, the common buffer stage identifies the object session from the QoS class to be subjected to the flow control, specifies the individual data corresponding to the session, and then instructs the individual trunk apparatus to do the flow control.

(2) When a congestion condition is detected, the common buffer stage informs the individual trunk stage of the object QoS class to be subjected to the flow control, and the individual trunk stage side identifies the individual data of the session corresponding to the specified QoS class to effect the flow control.

In addition, if a plurality of sessions have the same QoS classes and are objects to be subjected to the switching control, generally, all of these sessions are subjected to the switching. However, if there is a session from a user requiring a high QoS class, it is also possible to increase the priority only for the session by setting the above-mentioned threshold value low.

In the method of flow control according to the present invention, preferably, an amount of used portion of the common buffer is periodically monitored at a constant period, and when a congestion condition is detected, a priority is updated, and it is controlled to transmit from the individual trunk apparatus the individual data of a session of the QoS class corresponding to the priority. This method can provide a flow control with confirmation of the congestion condition changing momentarily in order to enable eliminating congestion conditions efficiently with necessary communication qualities.

The second object of the present invention can be achieved by a flow control system for a common channel in a base station transmitting-receiving control system for wireless communication for multiple access including the common channel for multiplex transmission, the system comprising: an individual trunk apparatus for transmitting individual data for each session received from a network as transmission side common channel data; and a common buffer apparatus, having a common buffer temporarily storing a plurality of the sessions received from the individual trunk apparatus all together, for monitoring a congestion condition of the channel from an amount of used portion of the common buffer, wherein from the individual trunk apparatus to the common buffer apparatus, transmission of the individual data is halted or restricted for a session corresponding to a QoS class having a priority that is low when the congestion condition is detected in said common buffer apparatus.

The second object of the present invention can be also achieved by a flow control system for a common channel in a base station transmitting-receiving control system for wireless communication for multiple access including the common channel for multiplex transmission, the system comprising: an individual trunk apparatus for transmitting individual data for each session received from a network as transmission side common channel data; and a common buffer apparatus, having a common buffer temporarily storing data of a plurality of the sessions received from the individual trunk apparatus in the common buffer all together, for monitoring a congestion condition of the common channel from an amount of used portion of the common buffer; wherein when the congestion condition is detected, at the common buffer apparatus, in a condition that a vacant channel exists in individual channels on the multiple access, the individual trunk apparatus directly assigns the individual data of the session corresponding to a QoS having a priority that is high to the vacant channel at a transmission side to transmit it.

BEST MODE FOR CARRYING OUT THE INVENTION

Figure 1:
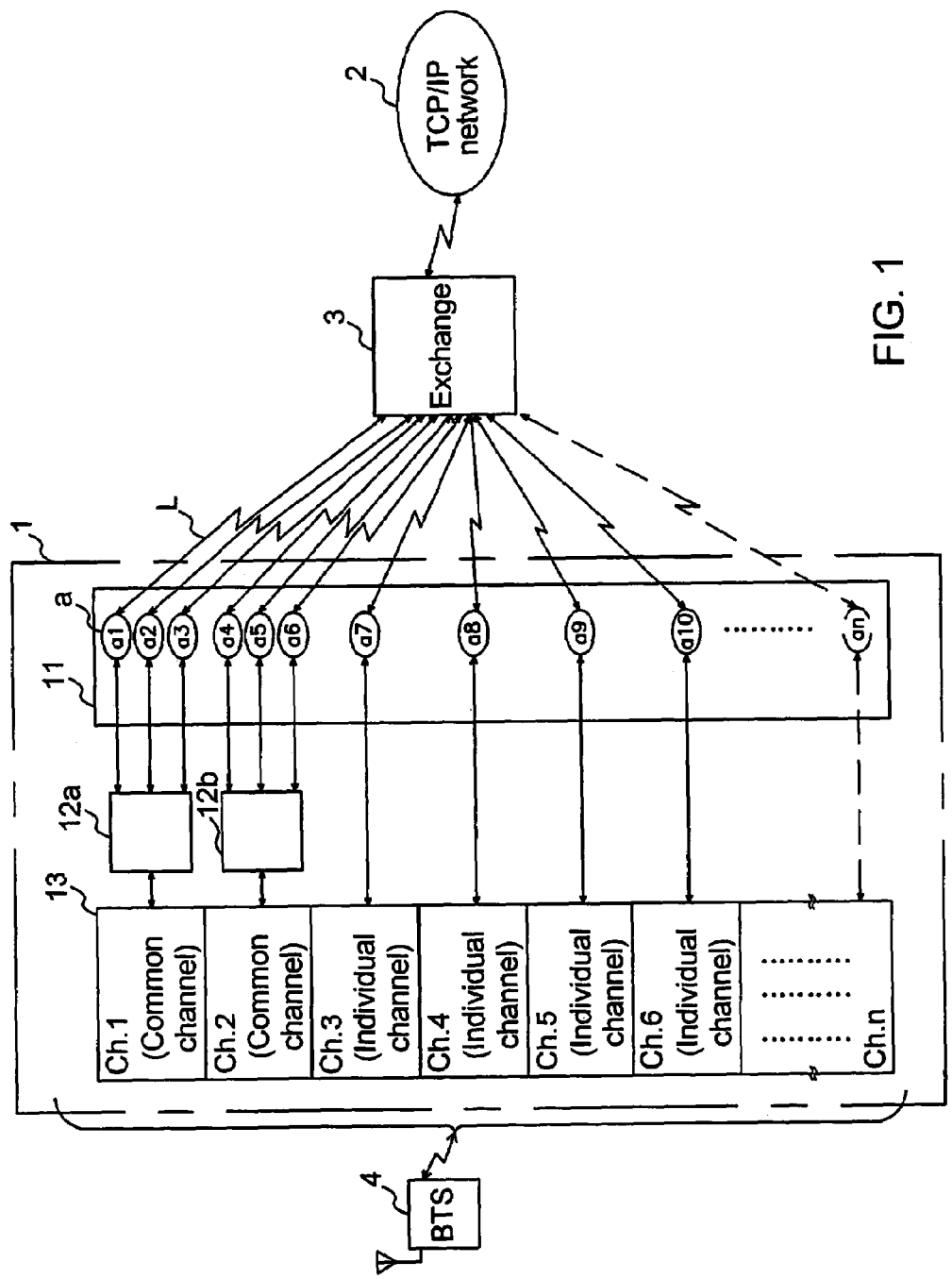
FIG. 1 is a block diagram illustrating a construction of a base station transmitting-receiving control apparatus used in wireless communication system having multiple access including common channels for multiplex transmission.
Figure 2:
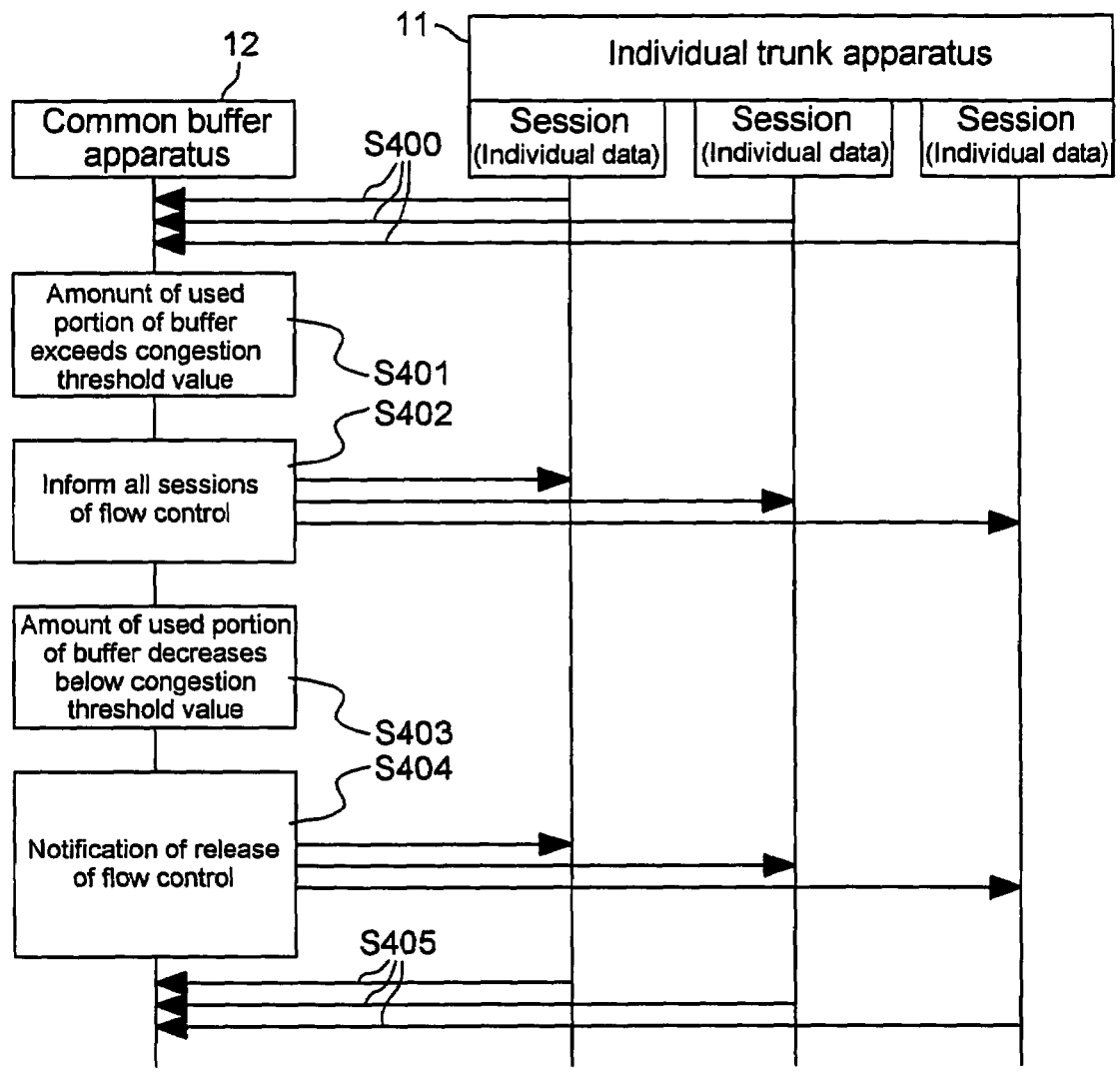
FIG. 2 is a flow chart illustrating the conventional method of flow control for common channels.

A first embodiment will be described regarding a method of flow control for common channels according to the present invention with reference to the drawings. The present invention relates to a method of flow control for communication channels within base station transmitting-receiving control apparatus 1 in a wireless communication system, with assumption that the base station transmitting-receiving control apparatus is for multiple access including common channels for multiplex transmission like that shown in FIG. 1. Thus, TCP/IP network 2, exchange 3, base station transmitting-receiving apparatus 1, and base transceiver station (BTS) 4 are the same as those shown in FIG. 1 in construction and connection relationships. Particularly, in this embodiment, base station transmitting-receiving control apparatus 1 comprises individual trunk apparatus 11 and common buffer apparatuses 12a and 12b, and multiplexing apparatus 13 like that shown in FIG. 1. Here, a plurality of common buffer apparatuses 12a and 12b are represented by common buffer apparatus 12 described below.

Figure 3:
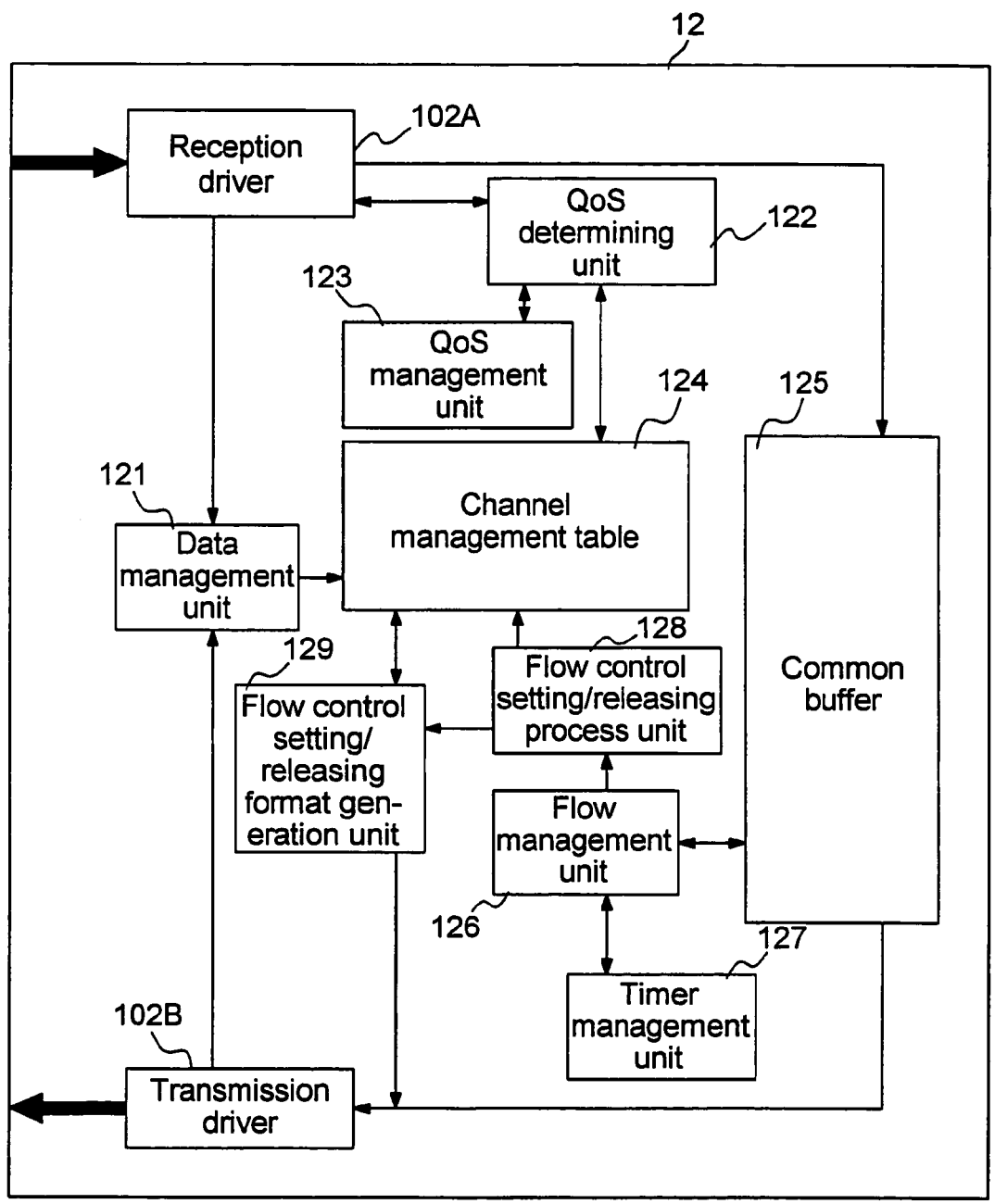
FIG. 3 is a block diagram showing a construction of a common buffer apparatus provided within the base station transmitting-receiving control apparatus in an embodiment of the present invention.

FIG. 3 shows a construction of common buffer apparatus 12 provided within base station transmitting-receiving control apparatus 1 in the first embodiment of the present invention. As shown in FIG. 3, common buffer apparatus 12 includes:

(1) reception driver 102A for receiving individual data for each session transmitted from individual trunk apparatus 11;

(2) data management unit 121 for obtaining the number of pieces of data, a data flow rate (bit/second) (or an amount of remaining data in the buffer (the number of bits)) for each QoS class (or session) in common buffer 125 on the basis of individual data transmitted from and received by common buffer apparatus 12, and for recording them in channel management table 124;

(3) QoS determining unit 122 for managing a parameter and a congestion level threshold value for each QoS class (or session) in the channel management table 124 on the basis of QoS class (or a session and QoS class) of the individual data entering the reception driver 102A;

(4) QoS management unit 123 for storing and managing a parameter which is set for each QoS class;

(5) channel management table 124 having, for each QoS class (or session), tables of the number of pieces of data, a data flow rate (or the number of pieces data remaining the common buffer), a congestion level, a congestion level threshold value, a difference between the congestion level and the congestion level threshold value, and the presence or the absence of a flow control flag;

(6) common buffer 125 for temporarily storing the received individual data all together and transmitting it to transmission driver 102B;

(7) flow management unit 126 for monitoring an amount of the used portion of common buffer 125;

(8) timer management unit 127 for periodically activating flow management unit 126 at a constant interval;

(9) flow control setting/releasing process unit 128 for searching the object QoS or session to be subjected to or released from the flow control;

(10) flow control setting/releasing format generation unit 129 for generating data for informing individual trunk apparatus 11 about the object QoS or session to be subjected to or released from the flow control or release; and

(11) transmission driver 102B for transmitting individual data transmitted from common buffer 125 to multiplexing apparatus 13 and transmitting a flow control setting or releasing instruction data to individual trunk apparatus 11.

Such a common buffer apparatus 12 is provided in base station transmitting-receiving control apparatus 1 in accordance with the number of channels for multiplex transmission set for multiple access.

Figure 4:
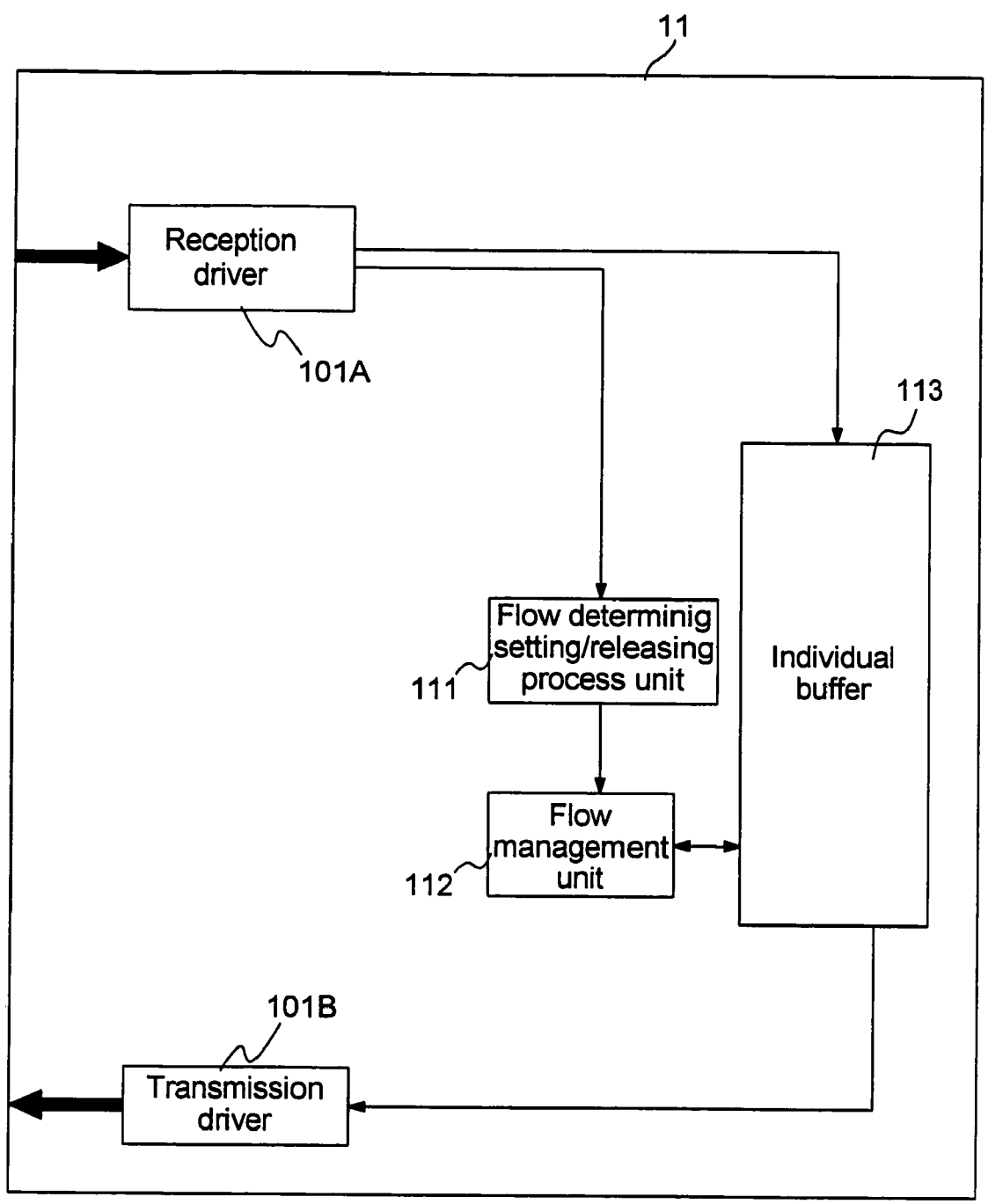
FIG. 4 is a block diagram showing a construction of an individual trunk apparatus provided within the base station transmitting-receiving control apparatus in the embodiment of the present invention.

On the other hand, FIG. 4 illustrates a structure of individual trunk apparatus 11 provided within base station transmitting-receiving control apparatus 1 in the first embodiment of the present invention. As shown in FIG. 4, individual trunk apparatus 11 comprises:

(1) reception driver 101A for receiving individual data for each session from individual line L and receiving flow control setting or releasing instruction data from common buffer apparatus 12;

(2) individual buffer 113 for temporarily storing the received individual data;

(3) flow setting/releasing process unit 111 for analyzing the flow control setting or releasing instruction data from common buffer apparatus 12;

(4) flow management unit 112 for instructing individual buffer 113 to stop, restrict, or restart a flow of individual data transmission to transmission driver 101 B on the basis of control content (control setting or control releasing) informed from flow control setting/releasing process unit 111; and (5) transmission driver 101B for transmitting individual data to common buffer apparatus 12 or multiplexing apparatus 13.

Individual buffer 113, flow control setting/releasing process unit 11 1, flow management unit 112 carry out management for each session. Here, only one block is shown in the drawing for each of individual buffer 113, flow control setting/releasing process unit 111, and flow management unit 112. In actual, they are prepared in accordance with the number of sessions via individual lines L. Individual reception unit "a" shown in FIG. 1, in this embodiment, comprises individual buffer 113, flow control setting/releasing process unit 111, and flow management unit 112.

Figure 5:
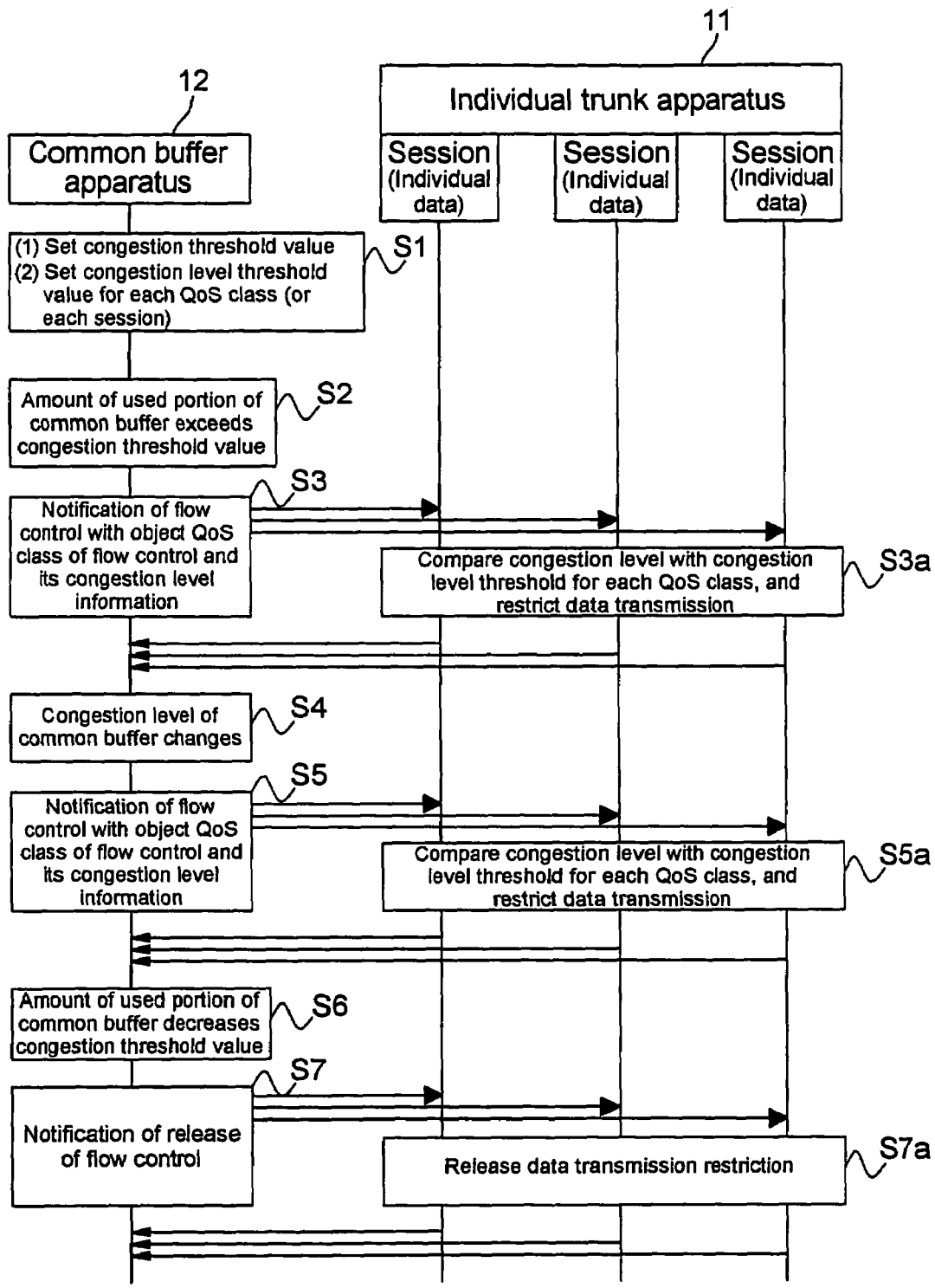
FIG. 5 is a flow chart generally illustrating the flow control for common channels according to a first embodiment of the present invention.

Next, there is description about the flow control for the common channels in base station transmitting-receiving control apparatus 1 including individual trunk apparatus 11 and common buffer apparatus 12 as mentioned above. FIG. 5 is a flow chart generally illustrating the process for a method of flow control according to this embodiment. Here, it is assumed that communication for each session via individual line L has been established and that a certain common channel becomes in a congestion condition.

At first, in step S1, a congestion threshold value is previously set with respect to an amount of the used portion of common buffer 125. Further, a congestion level threshold value for each QoS class (or each session) is set.

Communication starts and it is assumed that in step S2 the amount of used portion of common buffer 125 exceeds the congestion threshold value. Then, common buffer apparatus 12 identifies the QoS class (or session) to be subjected to the flow control in step S3 and informs individual trunk apparatus 11 about a flow control instruction with its congestion level information. As a result, individual trunk apparatus 11 compares the congestion level with a congestion threshold value for each QoS class in step S3a and restricts transmitting to common buffer apparatus 12 individual data for each session corresponding to the QoS class. Here, if session information reaches there, the transmission restriction is carried out for the object individual data as it is.

As a result of such a flow control, in step S4, the congestion level of common buffer 125 changes. In response to this change, in step S5, common buffer apparatus 12 newly identifies a QoS class (or session) to be subjected to the flow control and informs individual trunk apparatus 11 about a flow control instruction with its congestion level updating information. In response to this notice, in step S5a, individual trunk apparatus 11 compares the congestion level updating information with a congestion threshold value for each QoS class and restricts transmitting individual data to common buffer apparatus 12 for each sessions corresponding to the QoS class. Here, if the session information reaches there, transmission restriction is effected for the object individual data as it is.

As a result of such a flow control, in step S6, the amount of used portion of common buffer 125 decreases below the congestion threshold value. In response to the decrease in the amount of used portion below the congestion threshold value, in step S7, common buffer apparatus 12 informs individual trunk apparatus 11 of releasing the flow control. In response to this notice, in step S7a, individual trunk apparatus 11 releases individual data transmission restriction for the session to be subjected to the flow control.

As mentioned above, in this embodiment, the process can eliminate the congestion conditions while the communication quality corresponding to QoS required for each session is maintained.

Figure 6:
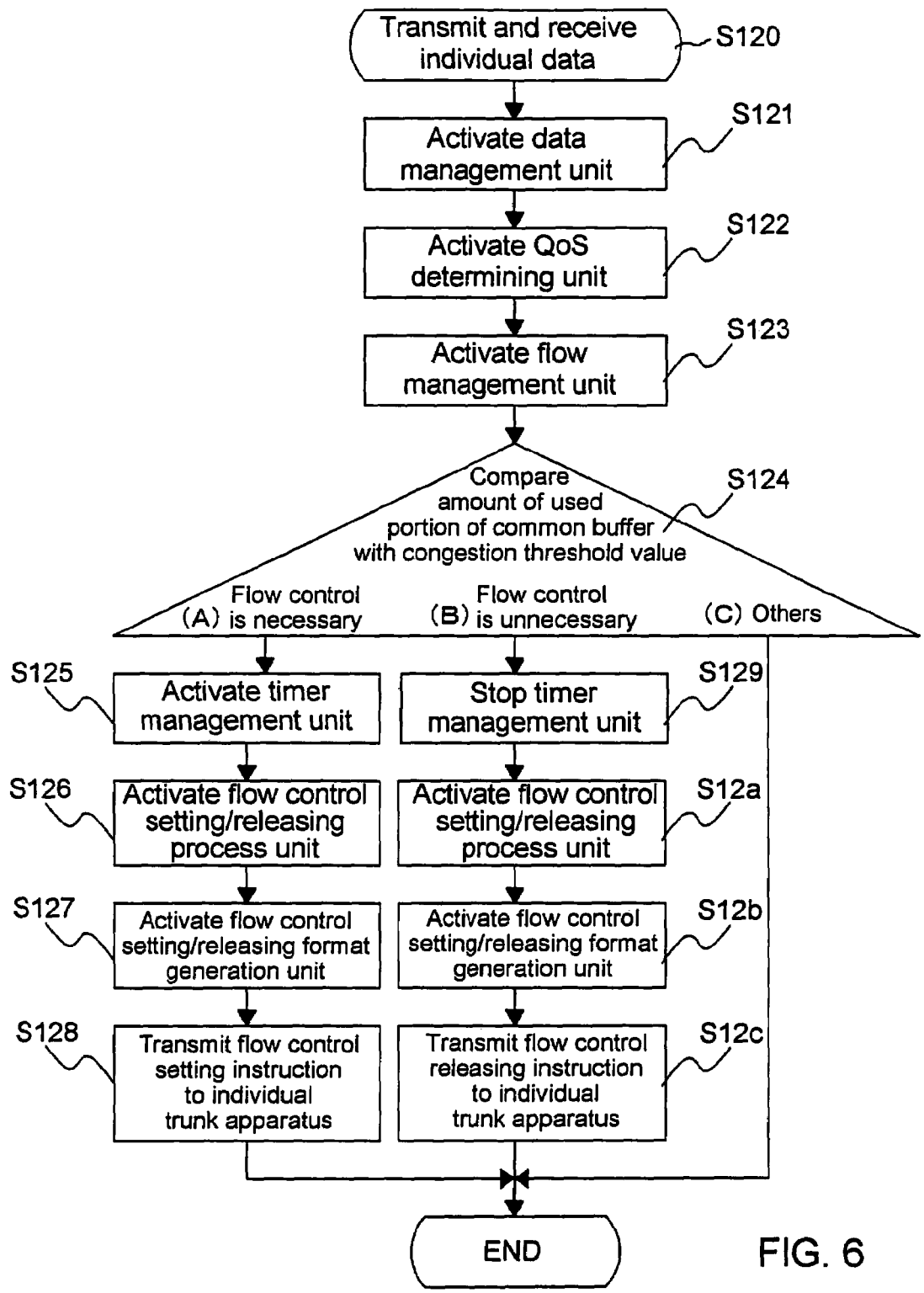
FIG. 6 is a flow chart illustrating in detail the process carried out by the common buffer apparatus in the flow control shown in FIG. 5.

Next, the flow of the flow control in common buffer apparatus 12 will be described in detail with reference to FIG. 6.

In step S120, when the reception driver 102A receives individual data from individual trunk apparatus 11, or when transmission driver 102B transmits individual data to multiplexing apparatus 13, data management unit 121 is activated in step S121. Data management unit 121 detects the QoS class (or session) of the received individual data and increments the number of pieces of data of corresponding QoS class (or session) in channel management table 124. Further, data management unit 121 obtains a data flow rate (bit/second) (or an amount of remaining data in the buffer (the number of bits)) in common buffer 125 from the amount of data (the number of bits) of the individual data, and writes the value on the table of the object QoS class (or session) in channel management table 124. Furthermore, data management unit 121 detects the QoS class or session of individual data transmitted from transmission driver 12B and decrements the number of pieces of data of the corresponding QoS class (or session) in channel management table 124. Further, data management unit 121 subtracts the data flow rate (bit/second) in common buffer 125 from the amount of the data (the number of bits) of the individual data, and writes the value on the table of the object QoS class (or session) in channel management table 124. In addition, the data management unit 121 always monitors input and output of individual data in common buffer apparatus 12 and updates the table of channel management table 124.

Next, in step S122, QoS determining unit 122 is activated. QoS determining unit 122 executes the following process.

(1) QoS determining unit 122 recognizes the QoS class (or session and QoS class) of the received individual data, reads a parameter of the corresponding QoS class from QoS management unit 123, and writes the value on a table for the object QoS class (or session) in channel management table 124. The parameter is, for example, such that the QoS class is classified into five classes, wherein "1" is for a highest priority quality, and "5" is for a lowest quality, and wherein as a parameter for each QoS class, QoS class 1 (highest priority) is set to have a multiplying factor of one, which is lowest and QoS class 5 (lowest) is set to have a multiplying factor of five, which is highest. Intermediate QoS classes are set to have multiplying factors determined stepwise.

(2) QoS determining unit 122 sets a congestion level threshold value and writes it in channel management table 124. The value is a common threshold value among all QoS classes (or all sessions). Further, the congestion level threshold value can be obtained from the number of sessions existing in common buffer 125 at transmission and reception timings of the individual data, the parameter of QoS class for the session, a quality for the session required from a user, a capacity of common buffer 125, and the like.

In addition, in a usual wireless communication condition, the above-described multiplying factors are set such that the sessions are successively made an object of the flow control in order from one having a lower priority level (QoS class 5 (lowest)). However, if sessions with QoS class 1 (highest priority) extremely converge on common channels, and a few of sessions of QoS class 5 (lowest) exist there, in order to eliminate the congestion condition, sessions with QoS class 1 (highest priority) may become objects of the flow controls.

QoS determining unit 122 also always monitors input and output of individual data in common buffer apparatus 12 and updates the tables in channel management table 124.

After that, in step S123, flow management unit 126 is activated. Flow management unit 126 checks the amount of used portion of common buffer 125 (the number of pieces of data stored in the buffer).

Next, in step S124, flow management unit 126 compares the amount of used portion of common buffer with predetermined congestion threshold value and determines one among following cases A to C in accordance with the comparison result to execute a process in accordance with the determined case.

Case A:

If the amount of used portion of common buffer exceeds the congestion threshold value, the determined case is case A. In case A, the flow control is determined to be necessary.

In the process in case A, at first, timer management unit 127 is activated in step S125. Timer management unit 127 activates a timer to newly check the amount of the used portion of common buffer 125 by activating flow management unit 126 at a constant period to execute the process from step S123 as long as it is in the condition requiring the flow control.

Next, in step S126, flow control setting/releasing process unit 128 is activated. Flow control setting/releasing process unit 128 carries out the following process.

(1) Flow control setting/releasing process unit 128 draws out a data flow rate (bit/second) (or an amount of buffer remaining data (the number of bits)) for each QoS class (or session) from channel management table 124.

(2) Flow control setting/releasing process unit 128 calculates a congestion level for each QoS class (or session) by multiplying the data flow rate (bit/second) (or an amount of buffer remaining data (the number of bits)) drawn as mentioned above by the parameter set by QoS determining unit 122 in step S122.

(3) Flow control setting/releasing process unit 128 compares the congestion level obtained in the above-mentioned (2) for each QoS class (or session) with the congestion level threshold value set in the channel management table 124. Flow control setting/releasing process unit 128 sets a flag indicating necessity of the flow control on a table of the object QoS class (or session) in channel management table 124 for the QoS class (or session) of which congestion level exceeds the congestion threshold value in order to indicate the flow-control object.

(4) Flow control setting/releasing process unit 128 transmits a trigger signal to flow control/releasing format generation unit 128 at the stage in which processing up to the above (3) has been finished.

Next, in response to the trigger signal transmitted in step S126, flow control/releasing format generation unit 128 is activated in step S127. Flow control/releasing format generation unit 128 searches flag information in channel management table 124 and reads table information of QoS class (or session) on which a flag is set and generates data for flow control setting. This data includes the object QoS class (or session) to be subjected the flow control, the congestion level, the congestion threshold value, and the like.

After that, in step S128, the flow control setting data generated in step S127 is transmitted as flow control setting instruction information from flow control/releasing format generation unit 128 via transmission driver 102B to individual trunk apparatus 11. Then, the process for case A has finished.

It should be noted that, in the above processing, the congestion level threshold value may be set for each QoS class (or session). That is, the data flow rate (bits/second) (or an amount of remaining data (the number of bits)) in common buffer 125 for each QoS class (or session) obtained in step S121 is defined as a congestion level, and at the stage of (2) in step S1 22, a congestion level threshold value is set for each QoS class (or session). Here, the congestion level threshold value is made correspondent to classification (five classes) of QoS class such that the congestion level threshold value for QoS class 1 (highest priority) has the highest value and that for QoS class 5 (lowest) has the lowest value. Intermediate QoS classes are set to have congestion threshold values determined stepwise. This successively makes an object QoS class to be subjected to the flow control in order from that has the low priority (QoS class 5 (lowest)) in accordance with the level of congestion.

In addition, in a usual wireless communication condition, the congestion level threshold values are set such that the sessions are successively made an object of the flow control in order from one having a lower priority level (QoS class 5 (lowest)). However, if sessions with QoS class 1 (highest priority) extremely converge on a common channel, and a few of sessions of QoS class 5 (lowest) exist, in order to eliminate the congestion condition, sessions with QoS class 1 (highest priority) may become objects of the flow controls.

Case B:

In step S124, if the amount of the used portion of the buffer decreases below a flow releasing threshold value after execution of the flow control, it is determined as case B. In case B, the flow control is determined to be unnecessary.

In case B, at first, in step S129, the timer management unit 127 is activated. The timer management unit 127 stops the timer.

Next, in step S12a, flow control setting/releasing process unit 128 is activated. Flow control setting/releasing process unit 128 executes the following process.

(1) Flow control setting/releasing process unit 128 resets all flags in channel management table 124 indicating necessity of the flow control and indicates flow control releasing.

(2) Flow control setting/releasing process unit 128, after process of above (1), transmits a trigger signal to flow control/release format generation unit 128.

After that, in step S12b, in response to the trigger signal generated in step S12a, flow control/releasing format generation unit 128 is activated. Flow control/releasing format generation unit 128 searches channel management table 124 for flag information and generates data for informing of flow control release by confirming that no flag exists.

Next, in step S12c the flow control releasing data generated in step S12b is transmitted as flow control releasing instruction information from flow control/releasing formation generation unit 128 via transmission driver 102B to individual trunk apparatus 11. Then, the process in case B has finished.

Case C:

In step S124, if the comparison result between the amount of used portion of common buffer and the congestion threshold value indicates an abnormal value, processing proceeds to end of process without execution of these processes.

As mentioned above, processes for cases A, B, and C determined in step S124 have been described. Furthermore, in the above-mentioned description, in the case of A, as long as the amount of buffer used portion exceeds the congestion threshold value, the congestion condition was checked periodically, and the flow control condition was updated in accordance with the condition. However, if the amount of buffer used portion exceeds the congestion threshold value, it is also possible to continue a constant flow control without updating the flow control condition without reserve with assumption that the congestion level corresponds to case C until the congestion level decreases to a certain constant level.

A flow of the flow control in individual trunk apparatus 11 will be further described in detail with reference to FIG. 7.

At first, the process in the case that the flow control instruction information is received from common buffer apparatus 12 will be described.

When the flow control instruction information is received from common buffer apparatus 12 in step S1 10, at first, flow control setting/releasing process unit 111 is activated in step S111. Flow control setting/releasing process unit 111 executes the following process on the basis of the flow control instruction information from common buffer apparatus 12.

(1) Flow control setting/releasing process unit 111 specifies a QoS class (or session) to be subjected to the flow control.

(2) Flow control setting/releasing process unit 111 compares the congestion level of the object QoS class (or session) with the congestion level threshold value and determines an amount of transmission data per a unit time interval.

(3) Flow control setting/releasing process unit 111 informs flow management unit 112 about, as control instruction information, the QoS class (or session) specified as mentioned above and the amount of transmission data per a unit time interval determined as mentioned above.

Next, in step S112, flow management unit 112 is activated. Flow management unit 112 sets an amount of transmission data per a unit time interval for each session on the basis of the amount of transmission data per a unit time interval for QoS class instructed from flow control setting/releasing process unit 111 and performs the flow control for individual data on the basis of the setting value. In addition, when there is a notice of the amount of transmission data per a unit time interval for each session from flow control setting/releasing process unit 111, the noticed value is used as it is to effect the flow restriction of individual data. Here, if the level of congestion is considerable, the flow restriction to make the amount of transmission data zero, namely, stop of transmission, may be possible.

It should be noted that, the process for determining the amount of transmission data per a unit time interval in step 111 may be previously done on the side of common buffer apparatus 12. That is, in common buffer apparatus 12, after the process (3) in step 126 shown in FIG. 6, it is also possible by successively executing: calculation for comparing (subtraction) the congestion level with the congestion threshold value of the QoS class (or session) to be subjected to the flow control; a process for writing the difference value on the object QoS class table in channel management table 124; and transmission of the calculation result to individual trunk apparatus 11.

Next, the operation of individual trunk apparatus 11 will be described in the case that flow control release information is received from common buffer apparatus 12.

When the flow control release information is received in step S10, the flow control setting/releasing process unit 111 is first activated in step S111. Flow control setting/releasing process unit 111 specifies a QoS class (or session) to be subjected to the flow control releasing on the basis of the flow control releasing instruction information from common buffer apparatus 12 and notices the flow management unit 112.

After that, in step S112, the flow management unit 112 is activated. Flow management unit 112 releases the flow control for all sessions corresponding to the QoS classes instructed from flow control setting/releasing process unit 111. Further, when there is a notice of session from flow control setting/releasing process unit 111, flow management unit 112 releases the flow control for the session.

As described above, the flow control for common channels according the present embodiment is done. According to the first embodiment, because the data flow rate is controlled on the basis of the priory determined on the basis of the QoS class, congestion conditions can be eliminated while the necessary communication quality is maintained. That is, uniformly, the session with a higher priority is communicated in the same condition as is done before the data flow rate is restricted, and the session with a low priority is subjected to the data flow rate restriction to maintain the communication quality. Furthermore, because sessions to be subjected to the data flow rate control is discriminated using the relationship of weighting on the basis of the data flow rate or the amount of the remaining data in the common buffer for each session and the QoS class, the data flow rate for each session in the common buffer is controlled on the basis of the QoS class required for the session, and congestion conditions can be eliminated with necessary communication qualities. In addition, because the transmission data flow rate from the individual trunk stage is restricted in accordance with the magnitude of a difference between the value of priority and the threshold value, elimination of congestion conditions can be more efficiently provided with necessary communication qualities. For example, if the difference between the value of a priority and a threshold value is large, the amount for restriction the transmission data flow rate is made large or full, and if the difference is small the amount of restriction for the transmission data flow rate is made small. That is, the transmission data flow rate is controlled in proportion with the magnitude of the difference between the value of the priority and the threshold value to provide efficient elimination of congestion conditions.

Furthermore, the amount of used portion of the common buffer is monitored periodically. When a congestion condition is detected, a priority is updated and set, and the transmission of individual data of a session of a QoS class corresponding to the priority from individual trunk apparatus is controlled. Accordingly, the flow control can be provided with confirming the congestion condition changing successively, so that an efficient elimination of congestion conditions is provided with necessary communication quality.

Now, a second embodiment of a method of common channel flow control according to the present invention will be described with reference to drawings. Here, it is assumed that the construction shown in FIG. 1 is used as the wireless communication system. Particularly, it is assumed that the structure of the common channel apparatus and an individual trunk apparatus, respectively shown in FIGS. 3 and 4, are used. In addition, as clearly understood from the following operation description, this embodiment is different from the first embodiment in the process of the flow control for common channel using the common channel apparatus and individual trunk apparatus.

Figure 8:
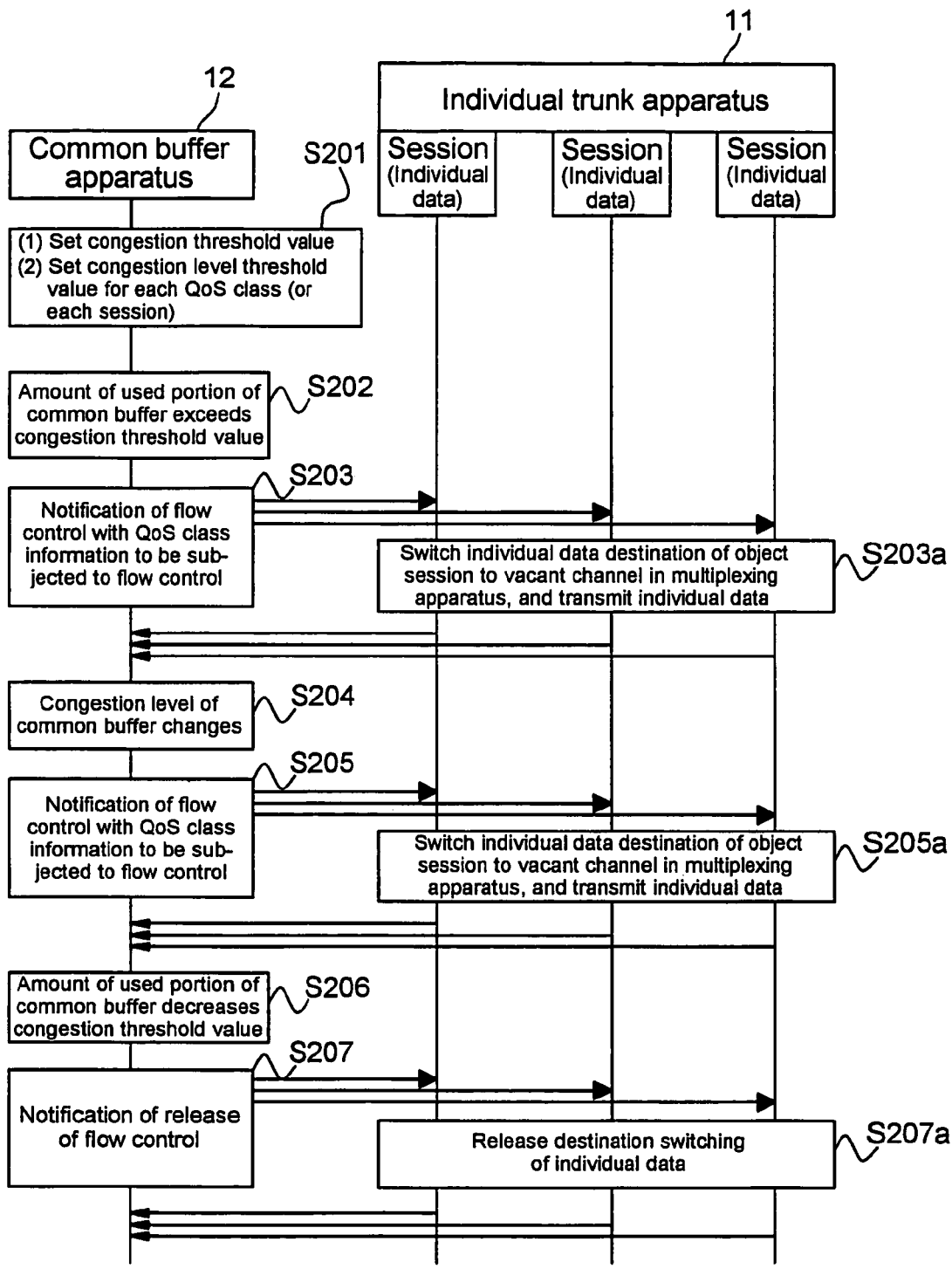
FIG. 8 is a flow chart generally illustrating the flow control for common channels according to a second embodiment of the present invention.

FIG. 8 generally illustrates a flow of the flow control for common channels according to the second embodiment. Here, it is assumed that in the communication system shown in FIG. 1, communication via an individual line L for each session has been established and that the nth channel ch.n which is an individual channel is a vacant channel.

At first, in step S201, the congestion threshold value for the amount of used portion of common buffer 125 is previously set. Further, a congestion level threshold value of each QoS class (or each session) is set.

In step S202, it is assumed that the amount of used portion of common buffer 125 exceeds the congestion threshold value. Then, in step S203, communication buffer apparatus 12 specifies an object QoS class (or session) to be subjected to the flow control and informs individual trunk apparatus 11 of the flow control instruction. Further, in step S203*a*, common buffer apparatus 12 switches the destination of individual data for each session corresponding to the QoS class to be subjected to the flow control to the vacant channel ch.n of the individual channels in multiplexing apparatus 13, and performs transmission. Here, if the session information reaches there, the object individual data is transmitted after channel is switched to the vacant channel ch.n.

The transmission with switching to the vacant channel of individual channels changes the congestion level of common buffer 125 in step S204. Then, in step S205, common buffer apparatus 12 newly specifies a QoS class (or session) to be subjected to the flow control and informs individual trunk apparatus 11 of the flow control instruction.

Individual trunk apparatus 11 informed of the new flow control instruction performs transmission after destination of individual data for each session corresponding to the QoS class to be subjected to the flow control is switched to the vacant channel ch.n of individual channels in the multiplexing apparatus 13 in step S205*a*. Here, if the session information reaches there, the object individual data is transmitted as it is with switching to the vacant channel ch.n.

This flow control decreases the amount of used portion of common buffer 125 below the congestion threshold value in step S206. As a result, in step S207, common buffer apparatus 12 informs individual trunk apparatus 11 of release of the flow control.

Individual trunk apparatus 11 informed of release of the flow control releases the destination switching for individual data of the session to be subjected to the flow control instep S207*a*. That is, the destination of individual data of these sessions is restored to the original common buffer apparatus 12.

In this embodiment, the session with a higher priority on the common channel in a congestion condition, namely, the session whose required QoS is high, is switched to a vacant channel of individual channels to maintain the communication quality. In addition, the congestion condition in the common channel can be also eliminated.

As mentioned above, in the second embodiment, the internal structures of common buffer apparatus 12 and individual trunk apparatus 11 are the same as those in the first embodiment, and the operation content are also the same as that of the first embodiment basically. However, there is a difference such that the parameter or the congestion level threshold value is set for each QoS class to specify a session with a low priority in the first embodiment, but to specify a session with a high priority in the second embodiment.

Concretely, against the flow of the flow control in common buffer 12 according to the first embodiment, QoS determining unit 122 executes the following process at the stage of step S122.

(1) QoS determining unit 122 recognizes the QoS class (or session and the QoS class) of the received individual data, reads the parameter of the corresponding QoS class from QoS management unit 123, and writes the value on the table for the object QoS class (or session) in channel management table 124. The parameter is, for example, such that the QoS class is classified into five classes, wherein "1" is for the highest priority quality and "5" is for the lowest priority quality, and wherein as a parameter for each QoS class, QoS class 1 (highest priority) is set to have a multiplying factor of five, which is highest, and QoS class 5 (lowest) is set to have a multiplying factor of one, which is lowest. Intermediate QoS classes are set to have multiplying factors determined stepwise.

(2) QoS determining unit 122 sets a congestion level threshold value and writes the congestion level threshold value in channel management table 124. The value is a common threshold value among all QoS classes (or all session).

Alternatively, the congestion level threshold value is set for each QoS class (or each session), and thus, QoS determining unit 122 defines the data flow rate (bit/second) (or the amount of buffer remaining data (the number of bits)) in common buffer 125 for each QoS class obtained in step S121 as the congestion level and sets the congestion level threshold value for each QoS class (or each session) on the basis of the process (2) in step S122 of the first embodiment. During this, the congestion level threshold value is set to have correspondence with classes (five classes) of the QoS class such that the QoS class 1 (highest priority) is set to have the lowest value of the congestion level threshold value and the QoS class 5 (lowest priority) is set to have the highest value of the congestion level threshold value. Intermediate QoS classes are set to have congestion level threshold values determined stepwise.

The above-mentioned setting enables discrimination of a high QoS class, and thus QoS classes can be successively included in the object of the flow control (transmission with switching to a vacant channel of individual channels) in order of priority from high (QoS class 1 (highest priority)) in accordance with the congestion level.

As mentioned above, because the second embodiment is different from the first embodiment in the process in common buffer apparatus 12, the flow of the flow control in individual trunk apparatus 11 in the second embodiment is changed from the flow in the first embodiment shown in FIG. 7 as follows:

First, the operation will be described in the case that the flow control instruction information is received from common buffer apparatus 12.

Figure 7:
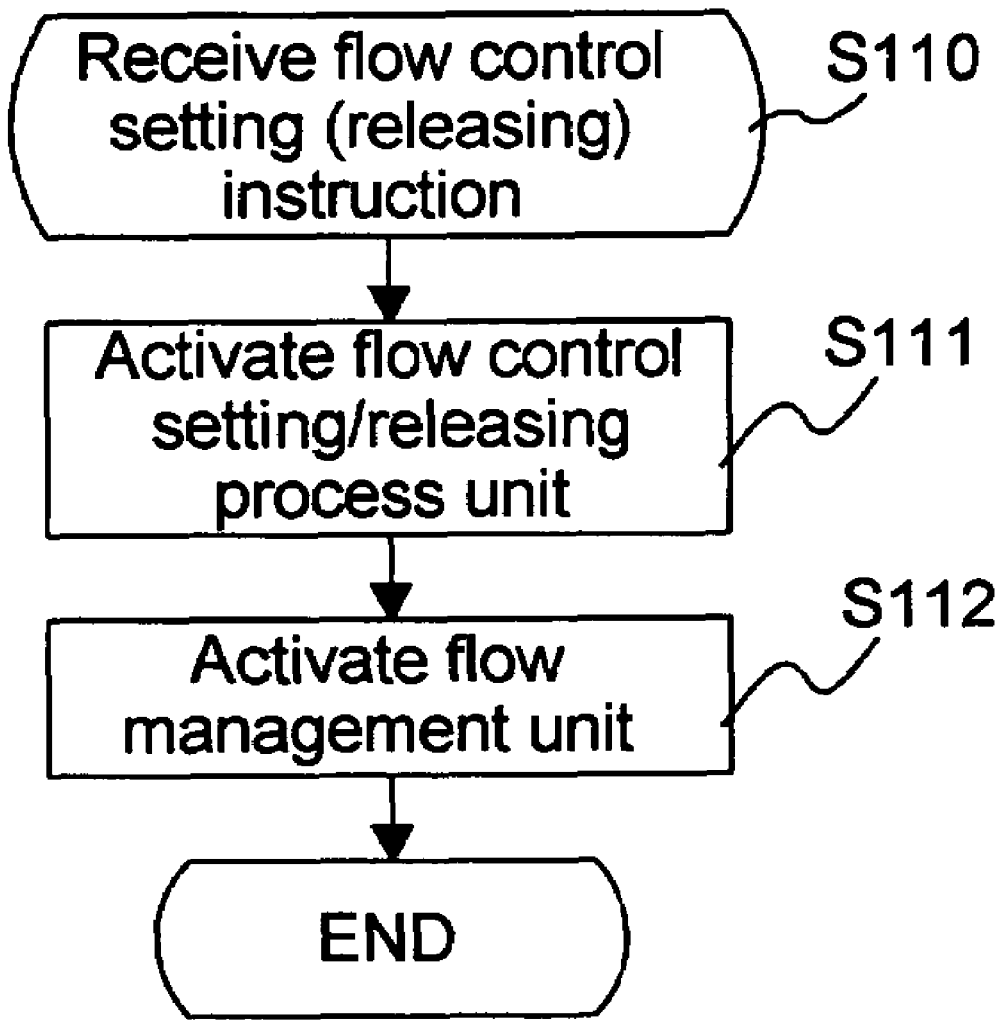
FIG. 7 is a flow chart showing in detail the process carried out by the-individual trunk apparatus in the flow control shown in FIG. 5.

In this case, the flow control setting/releasing process unit 111 is activated in step S111 in FIG. 7. In this embodiment, the flow control setting/releasing process unit 111 executes the following process on the basis of the flow control instruction information from common buffer apparatus 12.

(1) Flow control setting/releasing process unit 111 specifies a QoS class (or session) to be subjected to the flow control.

(2) Flow management unit 112 is informed of the specified QoS class (or session) as control instruction information.

Furthermore, in step S112 in FIG. 7, flow management unit 112 is activated. In this embodiment, flow management unit 112 executes the following process.

(1) From the vacant channel information (the number of vacant channels, object channels) of the individual channels and the session information corresponding to the object QoS class instructed from flow control setting/releasing process unit 111, flow management unit 112 makes QoS classes included in the flow control object up to such a QoS class that the total number of sessions accumulated from a QoS class having a higher priority is not larger than the number of the vacant channels in the individual channels. Here, if the session information from flow control setting/releasing process unit 111 reaches there, the flow management unit 112 makes sessions included in the flow control object up to such a session that the total number of sessions accumulated from a session having a higher priority is not larger than the number of the vacant channels in the individual channels.

(2) Flow management unit 112 changes a destination of session of individual data corresponding to the QoS class of the flow control object (or sessions of the flow control object) to the vacant channel ch.n of individual channels in multiplexing process apparatus 13. On the basis of this setting, transmission driver 101B transmits the object individual data to the vacant channel ch.n in the multiplexing process apparatus 13.

Next, the process for the case that the flow control release information is received from common buffer apparatus 12 will be described.

In this case, in step S111 in FIG. 7, the flow control setting/releasing process unit 111 is activated. In this embodiment, flow control setting/releasing process unit 111 specifies the QoS class (or session) of the flow control release object on the basis of the flow control release instruction information from common buffer apparatus 12 and informs the flow management unit 112 of it.

Further, in step S112 in FIG. 7, flow management unit 112 is activated. In this embodiment, flow management unit 112 releases the switched transmission with vacant channels for all sessions corresponding to the QoS class instructed from flow control setting/releasing process unit 111 and they are restored to the original common channels. If there is a notice of a session from flow control setting/releasing process unit 111, the session is restored to the common channel.

For switching from the common channel to a vacant channel of individual channels, as a concrete example, there is proposed switching from a common channel to an individual channel on the basis of the specification of the third generation mobile telecommunications. By such a switching, data is directly transmitted from an individual channel to the base transceiver station.

Further, the vacant channel information in the individual channels is supplied from the channel management performed in call connection control. Either of the common buffer apparatus or the individual trunk apparatus checks whether there is a vacant channel on the basis of the information. When it is confirmed that there is a vacant channel, the flow control mentioned above according to the second embodiment is carried out.

In the present invention, the above-mentioned flow control according to the first embodiment may be used together with the flow control according to the second embodiment. That is, when there is a vacant channel of individual channels on multiple access in a congestion condition in the common channel, a portion of sessions in the common channel with high priority is switched to vacant channels for transmission by application of the flow control according to the second embodiment, and as well as the flow control is executed for individual transmission of sessions with low priority in common channel by application of the first embodiment. This can eliminate congestion conditions with communication quality of each session maintained.

According to the second embodiment, because data transmission is controlled on the basis of the priority determined on the basis of the QoS class, congestion conditions can be eliminated with necessary communication qualities maintained. That is, uniformly, a destination of data of a session with a high priority is preferentially switched from a common channel to a vacant channel out of individual channels to provide communication qualities and as well as elimination of the congestion condition in the common channel. Further, the session of which data transmission is to be controlled is discriminated using the relationship of weighting on the basis of the data flow rate or an amount of remaining data in the common buffer and the QoS class for each session. This controls the data communication for each session on the basis of the QoS class required for the session, so that the congestion condition can be eliminated with necessary communication quality.

In addition, in the second embodiment, the amount of used portion of the common buffer is monitored periodically. When a congestion condition is detected, a priority is updated and set, and the transmission of individual data of a session of a QoS class corresponding to the priority from individual trunk apparatus is controlled. Accordingly, the flow control can be provided with confirming the congestion condition changing momentarily, so that an efficient elimination of congestion conditions is provided with necessary communication quality.

Industrial Applicability

According to the present invention, it is possible to eliminate congestion conditions with necessary communication quality maintained because the data flow rate is controlled on the basis of the priorities determined on the basis of QoS classes.

The invention claimed is:

1. A method of flow control for a common channel in a base station transmitting-receiving control system for wireless communication for multiple access including said common channel for multiplex transmission, said method comprising the steps of:
receiving individual data for a respective session from a network at a respective individual trunk apparatus;
transmitting the received individual data from said individual trunk apparatus to a common buffer as a destination for said individual data, said individual data having a priority;
temporarily storing data of a plurality of the sessions received from said individual trunk apparatus in said common buffer all together and monitoring a congestion condition of said common channel from an amount of used portion of said common buffer; and
one of halting and restricting transmitting individual data of a session corresponding to a quality of service (QoS) class having a priority that is low to said common buffer from said individual trunk apparatus,
wherein at least one of the step of receiving individual data and the step of temporarily storing said data to the common buffer includes vacant channel determination for determining whether a vacant channel exists on said multiple access,
the method further comprising the steps of, when said congestion condition is detected in a condition that the vacant channel exists in individual channels on said multiple access, directly assigning individual data of the session corresponding to a QoS having a priority that is high to said vacant channel at a transmission side from the individual trunk apparatus to transmit it,
wherein, when said congestion condition is eliminated, the flow control of halting or restricting transmission of the individual data of the session of the QoS class of the low priority is released and the transmission of the individual data of the QoS class of the high priority is switched to the common channel from the vacant channel,
wherein an amount of used portion of said common buffer is periodically monitored at a constant period, and when said congestion condition is detected, said priority is updated, and transmitting from said individual trunk apparatus the individual data of a session of the QoS class corresponding to the priority is controlled,
wherein said priority is set as a value obtained by multiplying one of a data flow rate and an amount of remaining data in the common buffer for each QoS class by a predetermined multiplying factor corresponding to the QoS class,
wherein a multiplying factor for a class with a high QoS is set low, and a multiplying factor for a class with a low QoS is set high, and
wherein any of QoS classes of which a value of said priority exceeds a predetermined threshold value is defined as said QoS class having said priority that is low.

2. The method of flow control according to claim 1, wherein a transmission data flow rate from said individual trunk apparatus to said common buffer is controlled for the session corresponding to the QoS class to be controlled on a basis of a magnitude of a difference between a value of said priority and said threshold value.

3. The method of flow control according to claim 2, wherein an amount of used portion of said common buffer is periodically monitored at a constant period, and when a congestion condition is detected, said priority is updated, and transmitting from said individual trunk apparatus the individual data of a session of the QoS class corresponding to the priority is controlled.

4. A method of flow control for a common channel in a base station transmitting-receiving control system for wireless communication for multiple access including said common channel for multiplex transmission, said method comprising the steps of:
receiving individual data for a respective session from a network at a respective individual trunk apparatus;
transmitting the received individual data from said individual trunk apparatus to a common buffer as a destination for said individual data, said individual data having a priority;
temporarily storing data of a plurality of the sessions received from said individual trunk apparatus in said common buffer all together and monitoring a congestion condition of said common channel from an amount of used portion of said common buffer; and
one of halting and restricting transmitting individual data of a session corresponding to a quality of service (QoS) class having a priority that is low to said common buffer from said individual trunk apparatus,
wherein at least one of the step of receiving individual data and the step of temporarily storing said data to the common buffer includes vacant channel determination for determining whether a vacant channel exists on said multiple access,
the method further comprising the steps of, when said congestion condition is detected in a condition that the vacant channel exists in individual channels on said multiple access, directly assigning individual data of the session corresponding to a QoS having a priority that is high to said vacant channel at a transmission side from the individual trunk apparatus to transmit it,
wherein, when said congestion condition is eliminated, the flow control of halting or restricting transmission of the individual data of the session of the QoS class of the low priority is released and the transmission of the individual data of the QoS class of the high priority is switched to the common channel from the vacant channel,
wherein an amount of used portion of said common buffer is periodically monitored at a constant period, and when said congestion condition is detected, said priority is updated, and transmitting from said individual trunk apparatus the individual data of a session of the QoS class corresponding to the priority is controlled, wherein said priority is set as a data flow rate in the common buffer for each QoS class, wherein a threshold value is predetermined for each QoS class such that a threshold value for a high QoS class is set high and a threshold value for a low QoS class is set low, and wherein a QoS class of which said value of priority exceeds the threshold value of the corresponding QoS class is defined as said QoS class having said priority that is low.

5. A flow control system for a common channel in a base station transmitting-receiving control system for wireless communication for multiple access including said common channel for multiplex transmission, said system comprising:

an individual trunk apparatus transmitting individual data for each session received from a network to a common buffer as a destination for said individual data; and a common buffer apparatus, having said common buffer temporarily storing data of a plurality of the sessions received from said individual trunk apparatus all together, and monitoring a congestion condition of the channel from an amount of a used portion of said common buffer; and wherein said individual data has a transmission priority, wherein, from said individual trunk apparatus to said common buffer apparatus, transmission of the individual data is one of halted and restricted for a session corresponding to a QoS class having a priority that is low when a congestion condition is detected in said common buffer apparatus, wherein, when said congestion condition is detected in a condition that the vacant channel exists in individual channels on said multiple access, directly assigning individual data of the session corresponding to a QoS having a priority that is high to said vacant channel at a transmission side from the individual trunk apparatus to transmit it wherein, when said congestion condition is detected on said common buffer apparatus, in a condition that the vacant channel exists in individual channels on said multiple access, said individual trunk apparatus directly assigns the individual data of the session corresponding to a QoS having a priority that is high to said vacant channel at a transmission side to transmit it, wherein, when said congestion condition is eliminated, the flow control of halting or restricting transmission of the individual data of the session of the QoS class of the low priority is released and the transmission of the individual data of the QoS class of the high priority is switched to the common channel from the vacant channel, wherein an amount of used portion of said common buffer is periodically monitored at a constant period, and when said congestion condition is detected, said priority is updated, and transmitting from said individual trunk apparatus the individual data of a session of the QoS class corresponding to the priority is controlled, wherein said priority is set as a value obtained by multiplying one of a data flow rate and an amount of remaining data in the common buffer for each QoS class by a predetermined multiplying factor corresponding to the QoS class, wherein the multiplying factor for a class with a high QoS is set low, and the multiplying factor for a class with a low QoS is set high, and wherein any of the QoS classes for which a value of said priority exceeds a predetermined threshold is defined as said QoS class having said priority that is low.

6. The flow control system according to claim 5, wherein an amount of used portion of said common buffer is periodically monitored at a constant period, and when a congestion condition is detected, said priority is updated, and transmitting from said individual trunk apparatus the individual data of a session of the QoS class corresponding to the priority is controlled.

7. The flow control system according to claim 5, wherein said common buffer apparatus further comprises:

a reception driver for receiving the individual data for each session transmitted from said individual trunk apparatus;

a channel management table having a table representing, for each QoS class, the number of pieces of data, a data flow rate, a congestion level, a congestion level threshold value, a difference between the congestion level and the congestion level threshold value, and the presence or absence of a flow control flag;

a data management unit obtaining, for each QoS class in said common buffer, the number of pieces of data and the data flow rate (bit/second) on the basis of the individual data transmitted to and received from said common buffer apparatus and for recording them in said channel management table;

a QoS determining unit for managing a parameter and the congestion level threshold value on a table for each QoS class in said channel management table on a basis of the QoS class of the individual data entering said reception driver;

a QoS management unit for storing and managing a parameter which is set for each said QoS class;

a flow management unit for monitoring an amount of used portion of said common buffer;

a timer management unit for periodically activating said flow management unit at said constant period;

a flow control setting/releasing process unit for searching an object QoS class to be subjected to the flow control or to be released;

a flow control setting/releasing format generation unit for generating data for informing said individual trunk apparatus of the object QoS class to be subjected to the flow control or to be released; and a transmission driver for transmitting the individual data transmitted from said common buffer to a multiplexing apparatus and transmitting flow control setting or releasing instruction data to said individual trunk apparatus.

8. The flow control system according to claim 7, wherein said individual trunk apparatus comprises:

a reception driver for receiving individual data for each session from an individual line and receiving flow control setting or releasing instruction data from said common buffer apparatus;

an individual buffer for temporarily storing the received individual data;

a flow control setting/releasing process unit for analyzing said flow control setting or releasing instruction data;

a transmission driver for transmitting said individual data to said common buffer apparatus; and a flow management unit for instructing said individual buffer to one of halt, restrict, and re-start the flow of transmitting the individual data corresponding to the QoS class of the low priority to said transmission driver, and to switch transmission of the individual data corresponding to the QoS class of the high priority to the vacant channel, on a basis of the control content informed from said flow control setting/releasing process unit.

9. A flow control system for a common channel in a base station transmitting-receiving control system for wireless communication for multiple access including said common channel for multiplex transmission, said system comprising:

an individual trunk apparatus transmitting individual data for each session received from a network to a common buffer as a destination for said individual data; and a common buffer apparatus, having said common buffer temporarily storing data of a plurality of the sessions received from said individual trunk apparatus in said common buffer all together, and monitoring a congestion condition of said common channel from an amount of a used portion of said common buffer; and wherein said individual data has a transmission priority, wherein, when said congestion condition is detected on said common buffer apparatus, in a condition that a vacant channel exists in individual channels on said multiple access, said individual trunk apparatus directly assigns the individual data of the session corresponding to a QoS having a priority that is high to said vacant channel at a transmission side to transmit it, wherein, when said congestion condition is eliminated, the flow control of halting or restricting transmission of the individual data of the session of a QoS class of the low priority is released and the transmission of the individual data of the QoS class of the high priority is switched to the common channel from the vacant channel, wherein an amount of used portion of said common buffer is periodically monitored at a constant period, and when said congestion condition is detected, said priority is updated, and transmitting from said individual trunk apparatus the individual data of a session of the QoS class corresponding to the priority is controlled, wherein said priority is set as a data flow rate in the common buffer for each QoS class, wherein a threshold value is predetermined for each QoS class such that a threshold value for a high QoS class is set high and a threshold value for a low QoS class is set low, and wherein a QoS classes of which said value of priority exceeds the threshold value of the corresponding QoS class is defined as said QoS class having said priority that is low.

10. The flow control system according to claim 9, wherein an amount of used portion of said common buffer is periodically monitored at a constant period, and when a congestion condition is detected, said priority is updated, and transmitting from said individual trunk apparatus the individual data of a session of the QoS class corresponding to the priority is controlled.

11. The flow control system according to claim 9, wherein said common buffer apparatus further comprises:

a reception driver for receiving the individual data for each session transmitted from said individual trunk apparatus;

a channel management table having a table representing, for each QoS class, the number of pieces of data, a data flow rate, a congestion level, a congestion level threshold value, a difference between the congestion level and the congestion level threshold value, and the presence or absence of a flow control flag;

a data management unit obtaining, for each QoS class in said common buffer, the number of pieces of data and the data flow rate (bit/second) on the basis of the individual data transmitted to and received from said common buffer apparatus and for recording them in said channel management table;

a QoS determining unit for managing a parameter and the congetion level threshold value on a table for each QoS class in said channel management table on a basis of the QoS class of the individual data entering said reception driver;

a QoS management unit for storing and managing a parameter which is set for each said QoS class;

a flow management unit for monitoring an amount of used portion of said common buffer;

a timer management unit for periodically activating said flow management unit at said constant period;

a flow control setting/releasing process unit for searching an object QoS class to be subjected to the flow control or to be released;

a flow control setting/releasing format generation unit for generating data for informing said individual trunk apparatus of the object QoS class to be subjected to the flow control or to be released; and a transmission driver for transmitting the individual data transmitted from said common buffer to a multiplexing apparatus and transmitting flow control setting or releasing instruction data to said individual trunk apparatus.

12. The flow control system according to claim 11, wherein said individual trunk apparatus comprises:

a reception driver for receiving individual data for each session from an individual line and receiving flow control setting or releasing instruction data from said common buffer apparatus;

an individual buffer for temporarily storing the received individual data;

a flow control setting/releasing process unit for analyzing said flow control setting or releasing instruction data;

a transmission driver for transmitting said individual data to said common buffer apparatus; and a flow management unit for instructing said individual buffer to one of halt, restrict, and re-start the flow of transmitting the individual data corresponding to the QoS class of the low priority to said transmission driver, and to switch transmission of the individual data corresponding to the QoS class of the high priority to the vacant channel, on a basis of the control content informed from said flow control setting/releasing process unit.

* * * * *